(12) United States Patent
Kim et al.

(10) Patent No.: US 7,733,825 B2
(45) Date of Patent: Jun. 8, 2010

(54) ROF LINK APPARATUS CAPABLE OF STABLE TDD WIRELESS SERVICE

(75) Inventors: Sang-Ho Kim, Seoul (KR); Yun-Je Oh, Yongin-si (KR); Seong-Taek Hwang, Pyeongtaek-si (KR); Byung-Jik Kim, Seongnam-si (KR); Gyu-Woong Lee, Suwon-si (KR); Hoon Kim, Suwon-si (KR); Sung-Kee Kim, Suwon-si (KR); Han-Lim Lee, Seoul (KR); Jae-Hoon Lee, Seoul (KR); Yong-Gyoo Kim, Seoul (KR); Dae-Eun Choi, Seoul (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 581 days.

(21) Appl. No.: 11/514,440

(22) Filed: Sep. 1, 2006

(65) Prior Publication Data

US 2007/0053311 A1    Mar. 8, 2007

(30) Foreign Application Priority Data

Sep. 2, 2005    (KR) ...................... 10-2005-0081878

(51) Int. Cl.
*H04W 4/00* (2009.01)
*H04L 12/56* (2006.01)

(52) U.S. Cl. .................. 370/328; 370/401; 455/561

(58) Field of Classification Search .............. None
See application file for complete search history.

(56) References Cited

U.S. PATENT DOCUMENTS

| | | | | |
|---|---|---|---|---|
| 3,889,063 | A * | 6/1975 | Slavin | 370/307 |
| 6,459,716 | B1 * | 10/2002 | Lo et al. | 372/50.1 |
| 6,763,193 | B1 * | 7/2004 | Chand et al. | 398/76 |
| 6,775,331 | B1 * | 8/2004 | Shinde | 375/297 |
| 6,970,652 | B2 * | 11/2005 | Zhang et al. | 398/162 |
| 7,036,031 | B2 * | 4/2006 | Takeuchi | 713/323 |
| 7,170,859 | B2 * | 1/2007 | Yamada et al. | 370/245 |

(Continued)

FOREIGN PATENT DOCUMENTS

KR     2003-95336     12/2003

(Continued)

*Primary Examiner*—Kevin C Harper
*Assistant Examiner*—Steven Wood
(74) *Attorney, Agent, or Firm*—Cha & Reiter, LLC

(57) ABSTRACT

A radio over fiber (ROF) link apparatus capable of a stable TDD wireless service for a time division duplexing (TDD) baseband signal includes a central access platform (CAP) for receiving various kinds of data including the TDD baseband signal from upper layers, multiplexing the data, electro-optically converting the multiplexed data, and transmitting the converted data as downstream data through an optical fiber, and opto-electrically converting upstream data received through the optical fiber, demultiplexing the converted upstream data, and transmitting the demultiplexed upstream data to the respective upper layers, and a remote access unit (RAU) for receiving the downstream data through the optical fiber, opto-electrically converting the received downstream data to the multiplexed data, demultiplexing the multiplexed data, performing a wireless access process of the demultiplexed data, and transmitting the wireless access processed data to a wireless local area network (WLAN) service terminal through an antenna.

9 Claims, 5 Drawing Sheets

U.S. PATENT DOCUMENTS

| | | | | |
|---|---|---|---|---|
| 7,440,642 | B2* | 10/2008 | Kim et al. | 385/3 |
| 7,483,455 | B2* | 1/2009 | Hattori | 372/29.02 |
| 7,483,506 | B2* | 1/2009 | Yajima et al. | 375/365 |
| 2002/0118413 | A1* | 8/2002 | Yamada et al. | 359/118 |
| 2002/0131465 | A1* | 9/2002 | Lo et al. | 372/50 |
| 2003/0078074 | A1* | 4/2003 | Sesay et al. | 455/561 |
| 2003/0103772 | A1* | 6/2003 | Ishii et al. | 398/197 |
| 2003/0228151 | A1* | 12/2003 | Niiho et al. | 398/115 |
| 2004/0017785 | A1* | 1/2004 | Zelst | 370/328 |
| 2006/0121944 | A1* | 6/2006 | Buscaglia et al. | 455/561 |
| 2006/0189354 | A1* | 8/2006 | Lee et al. | 455/561 |
| 2007/0030937 | A1* | 2/2007 | Yajima et al. | 375/373 |
| 2007/0053311 | A1* | 3/2007 | Kim et al. | 370/280 |
| 2008/0124087 | A1* | 5/2008 | Hartmann et al. | 398/115 |

FOREIGN PATENT DOCUMENTS

KR  2006-53453  5/2006

\* cited by examiner

ROF LINK APPARATUS CAPABLE OF STABLE TDD WIRELESS SERVICE

CLAIM OF PRIORITY

This application claims the benefit of the earlier filing date, pursuant to 35 U.S.C. §119 to that patent application entitled "ROF Link Apparatus Capable of Stable TDD Wireless Service," filed in the Korean Intellectual Property Office on Sep. 2, 2005 and assigned Serial No. 2005-81878, the contents of which are incorporated herein by reference.

BACKGROUND OF THE INVENTION

1. Field of the Invention

The present invention relates generally to a radio over fiber (ROF) link apparatus, and in particular, to an ROF link apparatus for transmitting a time division duplexing (TDD) wireless communication service without modulating a radio frequency (RF) band.

2. Description of the Related Art

Accompanying a variety, and a rapid increase, of information communication services, optical communication technology and wireless communication technology are being combined, thus increasing the necessity of a high-speed multimedia communication service.

Thus, research interests are concentrating on optical-wireless communication technology in which an ultra-high radio frequency is interlocked with a high-speed optical communication network to provide various kinds of bulk multimedia information communication services. By combining wired communication technology and wireless communication technology into an integrated technology of optical communication technology and wireless communication technology, a radio over fiber (ROF) technology is being vigorously studied.

Since an ROF system has many advantages, such as broadband channel capacity, low price, low power, and easy installation, operation, and management, the ROF technology provides appropriate solutions for high-speed wireless multimedia services for in-door applications such as airport terminals, shopping centers, and large-sized offices and out-door applications such as tunnels, narrow streets, and highways.

FIG. 1 is a block diagram of a conventional ROF link apparatus for a TDD wireless local area network (WLAN) service.

Referring to FIG. 1, the conventional ROF link apparatus includes a central station 100 and a base station 200. The central station 100 receives data from an upper layer, converts the received data to an RF signal for wireless communication, electro-optically converts the RF signal to an optical signal and transmits the optical signal to the base station 200 through an optical fiber. The central station 100 further receives upstream data generated in an RF manner from the base station 200 through the optical fiber, opto-electrically converts the received upstream data to an RF signal, converts the RF signal to baseband data, and transmits the baseband data to the upper layer. The base station 200 similarly, receives downstream data from the central station 100 through the optical fiber, opto-electrically converts the downstream data to an RF signal, and transmits the RF signal to a WLAN service terminal 300 through an antenna, and further receives upstream data from the WLAN service terminal 300, opto-electrically converts the upstream data to an optical signal, and transmits the optical signal to the central station 100 through the optical fiber. The central station 100 operates in TDD wireless communication protocol.

In the TDD wireless communication, the same frequency band is time divided and used for transmitting upstream data and downstream data. That is, an assigned frequency band is used to transmit downstream data in a specific time and used to transmit upstream data after the downstream data is transmitted. Thus, as the same frequency band is generally used to transmit upstream and downstream data, a TDD wireless system has better frequency usage efficiency than a conventional frequency division duplexing (FDD) wireless system. However, since a technique of processing data by dividing a short time period is required, the TDD wireless system has a relatively complex system configuration. Recently, TDD wireless systems are used in wireless services such as WLAN and mobile Internet.

When data is processed in the TDD wireless communication, as illustrated in FIG. 1, TDD data of a baseband is modulated to TDD data of an RF band using WLAN access points (APs) 101 and 102 operating in a TDD method included in the central station 100.

The central station 100 also includes an RF coupler/divider 103 for performing coupling and dividing operations to process an RF input and an RF output to and from the WLAN APs 101 and 102, and an opto-electrical converter 105 and an opto-electrical converter 104 for transmitting data through the optical fiber.

Each of the WLAN APs 101 and 102 includes an Ethernet switching unit for connecting with the upper layer, a baseband processing unit for converting baseband data input through the Ethernet switching unit to RF data, and an RF transceiver module for transmitting the converted RF data to the RF coupler/divider 103. Although only a downstream operation of the WLAN APs 101 and 102 has been described, and as the upstream operation is opposite to the downstream operation, the upstream operation need be not discussed in detail herein. However, it would be well within the knowledge of those skilled in the art to understand the upstream operation based on the discussion of the downstream operation discussed herein.

The base station 200 includes an opto-electrical converter 106 for converting an optical signal received from the central station 100 to an electrical signal, an electro-optical converter 107 for converting an electrical signal to an optical signal and transmitting the converted optical signal to the central station 100, and an RF amplifier 108 for amplifying downstream data (RF signal) converted to the electrical signal using the opto-electrical converter 106 to output through the antenna, and amplifying a weak RF signal received through the antenna to transmit to the central station 100 through the electro-optical converter 107.

As described above, the ROF link apparatus has a structure in which the central station 100 and the base station 200 are connected through the optical fiber, i.e., an optical relay structure of a general wireless communication system. However, since the TDD method is applied to the ROF link apparatus, the WLAN APs 101 and 102 are disposed in the central station 100.

Operations of the WLAN APs 101 and 102 will now be described. During a specific transmission time, an RF signal output from the WLAN AP 101 is modulated to an optical signal by the electro-optical converter 104 and transmitted to the base station 200 through the optical fiber. The transmitted optical signal is converted to an RF signal by the opto-electrical converter 106, amplified by the RF amplifier 108, and propagated through the antenna.

The operation described above is performed during the transmission time by the ROF link apparatus using the TDD method.

During a reception time, a weak upstream RF signal input through the antenna is low-noise amplified by a low noise amplifier (LNA: not shown) of the base station 200, amplified to an RF signal having a constant level by the RF amplifier 108, converted to an optical signal by the electro-optical converter 107, and transmitted to the central station 100 through the optical fiber. The transmitted optical signal is converted to an RF signal by the opto-electrical converter 105, input to the WLAN AP 102 through the RF coupler/divider 103, and processed by the WLAN AP 102.

As described above, when the WLAN APs 101 and 102 are disposed in the central station 100 for the TDD wireless communication of the ROF link apparatus, and a delay according to the length of the optical fiber may occur in the time division processing of the TDD method, throughput of service data may be reduced according to the length of the optical fiber, or the TDD system may not operate at all because of the amount of an optical signal loss.

When a signal is transmitted through a single mode optical fiber, a propagation delay time is around 5 µs/km is introduced in a typical environment. In a TDD WLAN system, a subsequent data frame can be transmitted only if an acknowledgement message, indicating that the other party has received a data frame without an error, is received within tens µs after an AP transmits the data frame. Thus, if an optical signal propagation delay time is too longer because the length of an optical fiber is longer than a predetermined distance, the possibility the acknowledgement message is received within a pre-defined time is high; thereby disabling a normal operation.

In the TDD WLAN system, based on the structure of the ROF link apparatus, a serviceable range is limited due to the optical signal propagation delay time and not an optical fiber link propagation loss. Thus, extension of the serviceable range is not sufficiently utilized, which is an advantage of ROF systems.

SUMMARY OF THE INVENTION

An object of the present invention is to substantially solve at least the above problems and/or disadvantages. Accordingly, an object of the present invention is to provide an ROF link apparatus capable of a stable TDD wireless service by disposing an AP for conversion to an RF signal in a base station to extend a serviceable range of the ROF link apparatus supporting TDD communication.

According to one aspect of the present invention, there is provided an ROF link apparatus capable of a stable TDD wireless service for a TDD baseband signal, the ROF link apparatus comprising a central access platform (CAP) for receiving various kinds of data including the TDD baseband signal from upper layers, multiplexing the data, electro-optically converting the multiplexed data, and transmitting the converted data as downstream data through an optical fiber, and opto-electrically converting upstream data received through the optical fiber, demultiplexing the converted upstream data, and transmitting the demultiplexed upstream data to the respective upper layers and a remote access unit (RAU) for receiving the downstream data through the optical fiber, opto-electrically converting the received downstream data to the multiplexed data, demultiplexing the multiplexed data, performing a wireless access process of the demultiplexed data, and transmitting the wireless access processed data to a WLAN service terminal through an antenna.

BRIEF DESCRIPTION OF THE DRAWINGS

The above features and advantages of the present invention will become more apparent from the following detailed description when taken in conjunction with the accompanying drawing in which.

DETAILED DESCRIPTION OF THE INVENTION

Preferred embodiments of the present invention will be described herein below with reference to the accompanying drawings. For the purposes of clarity and simplicity, well-known functions or constructions are not described in detail as they would obscure the invention in unnecessary detail.

Figure 1:
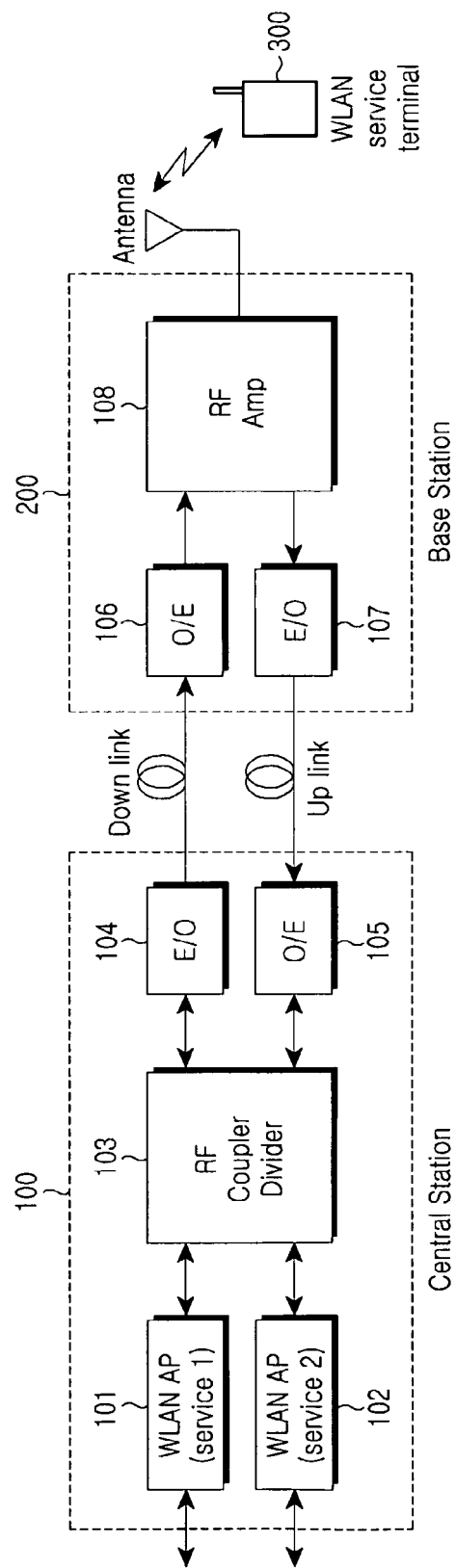
FIG. 1 is a block diagram of a conventional ROF link apparatus for a TDD WLAN service.
Figure 2:
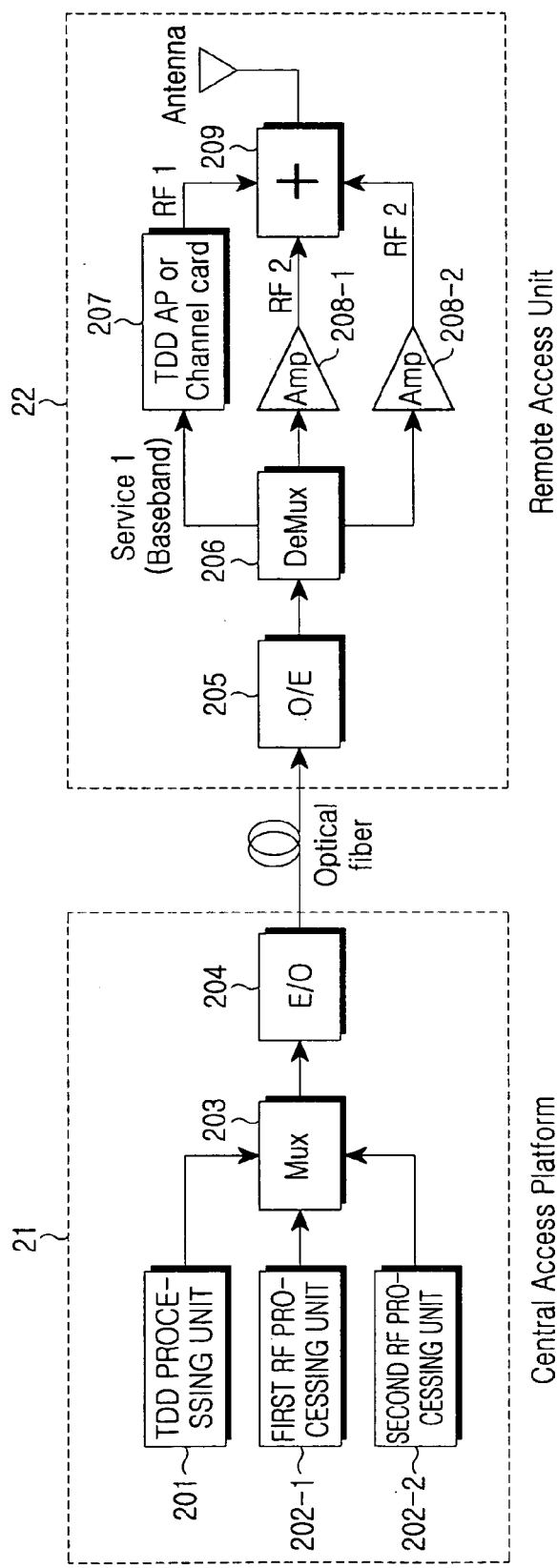
FIG. 2 is a block diagram of an ROF link apparatus capable of a TDD wireless service according to a first preferred embodiment of the present invention.

FIG. 2 is a block diagram of an ROF link apparatus capable of a TDD wireless service according to a first preferred embodiment of the present invention.

In the illustrated embodiment, one TDD wireless service and two non-TDD RF services are supported. Although different kinds of services can be changed according to a particular situation, the configuration in the illustrated embodiment is related to the TDD wireless service.

Referring to FIG. 2, the ROF link apparatus includes a central access platform (CAP) 21 and a remote access unit (RAU) 22. The CAP 21 receives various kinds of data from upper layers, multiplexes the received data, electro-optically converts the multiplexed data, and transmits the converted data to the RAU 22 through an optical fiber. Similarly, the CAP 21 receives upstream data from the RAU 22 through the optical fiber, opto-electrically converts the received upstream data, demultiplexes the converted upstream data, and transmits the demultiplexed upstream data to the respective upper layers. The RAU 22 receives downstream data from the CAP 21 through the optical fiber, opto-electrically converts the received downstream multiplexed data, demultiplexes the multiplexed downstream data, processes the demultiplexed downstream data in a wireless access method, and transmits the downstream data processed in the wireless access method to a WLAN service terminal through an antenna. The RAU 22 further receives upstream data from the WLAN service terminal, processes the received upstream data in the wireless access method, electro-optically converts the upstream data processed in the wireless access method, and transmits the converted upstream data to the CAP 21 through the optical fiber.

The current embodiment illustrated in FIG. 2 shows a downlink system structure in which the CAP 21 multiplexes a TDD baseband signal and two RF signals, electro-optically converts the signals to an optical signal, and transmits the converted optical signal to the RAU 22 including an AP. Although the downlink system structure is described in FIG. 2, and as an uplink system structure processes data in a direction opposite that of the downlink system structure, the uplink system structure would be easily understood by those skilled in the art, and thus its description is herein.

In more detail, the CAP 21 includes a TDD processing unit 201 for receiving a TDD baseband electrical signal from an upper layer and downstream processing the received TDD baseband electrical signal, first and second RF processing units 202-1 and 202-2 for receiving RF signals from upper layers and downstream processing the received RF signals, a multiplexer 203 for multiplexing signals output from the TDD processing unit 201 and the first and second RF processing units 202-1 and 202-2 to a single electrical signal, and an electro-optical converter 204 for converting the electrical signals multiplexed by the multiplexer 203 to an optical signal.

The RAU 22 includes an opto-electrical converter 205 for converting the optical signal received through the optical fiber to an electrical signal, a demultiplexer 206 for demultiplexing the electrical signals multiplexed by the multiplexer 203 of the CAP 21, first and second RF amplifiers 208-1 and 208-2 for amplifying RF signals among the demultiplexed signals, a TDD AP 207 for processing a TDD baseband electrical signal among the demultiplexed signals to an RF signal, and a coupler 209 for coupling the RF signals output from the TDD AP 207 and the first and second RF amplifiers 208-1 and 208-2 to a single signal and outputting the single signal through the antenna.

In one aspect of the invention for processing a TDD WLAN signal, the TDD baseband electrical signal in the CAP 21 is a 100 Base-TX Ethernet (100 Mb/s) signal. To convert the 100 Base-TX Ethernet signal to an optical signal using the electro-optical converter 204, a media conversion process from the 100 Base-TX signal to a 100 Base-FX signal is necessary. The media conversion process is performed by the TDD processing unit 201.

Accordingly, the RAU 22 also needs a process for converting the 100 Base-FX signal to opto-electrically converted by the opto-electrical converter 205 passing through the demultiplexer 206 to a 100 Base-TX signal. This process is performed by the TDD AP 207 in the illustrated embodiment of the invention. To do this, a media converter may be added to a front end of the TDD AP 207 to consider the TDD AP 207 as a simple AP. In FIG. 2, this media conversion function is performed by the TDD AP 207, but also may be performed separately (not shown).

When a baseband signal is directly modulated to an optical signal, an extinction ratio can be an important element for determining a transmission characteristic. For a 100 Base-TX Ethernet system, it can be considered that a data transmission capability is not degraded with an extinction ratio of 1 to 2 dB. Thus, when a baseband signal and RF signals are multiplexed and simultaneously optical modulated, rigid correlation setting between an optical modulation index (OMI) of an electro-optical converter for the RF signals and an extinction ratio of the baseband signal does not have to be significantly considered.

Figure 3:
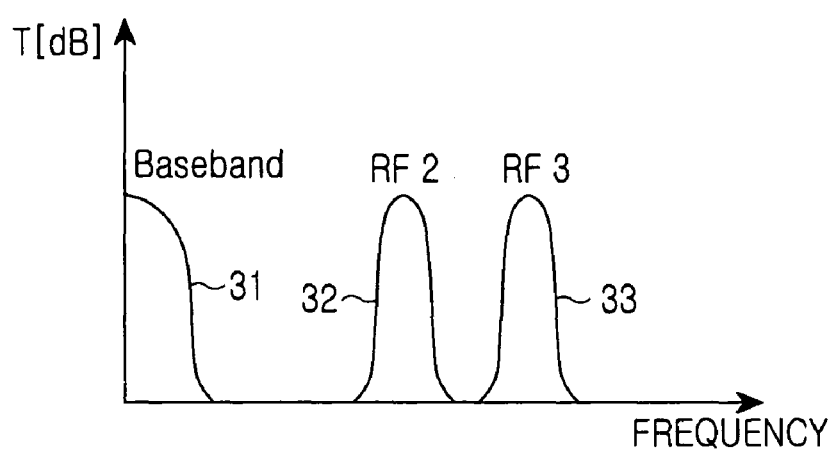
FIG. 3 is a diagram for explaining a frequency characteristic for multiplexing/demultiplexing in the ROF link apparatus illustrated in FIG. 2.

FIG. 3 is a diagram for explaining a frequency characteristic for multiplexing/demultiplexing in the ROF link apparatus illustrated in FIG. 2.

Referring to FIG. 3, according to the frequency characteristic for multiplexing/demultiplexing in the ROF link apparatus illustrated in FIG. 2, a baseband signal 31 and RF signals 32 and 33 are multiplexed/demultiplexed based on respective frequencies.

Figure 4:
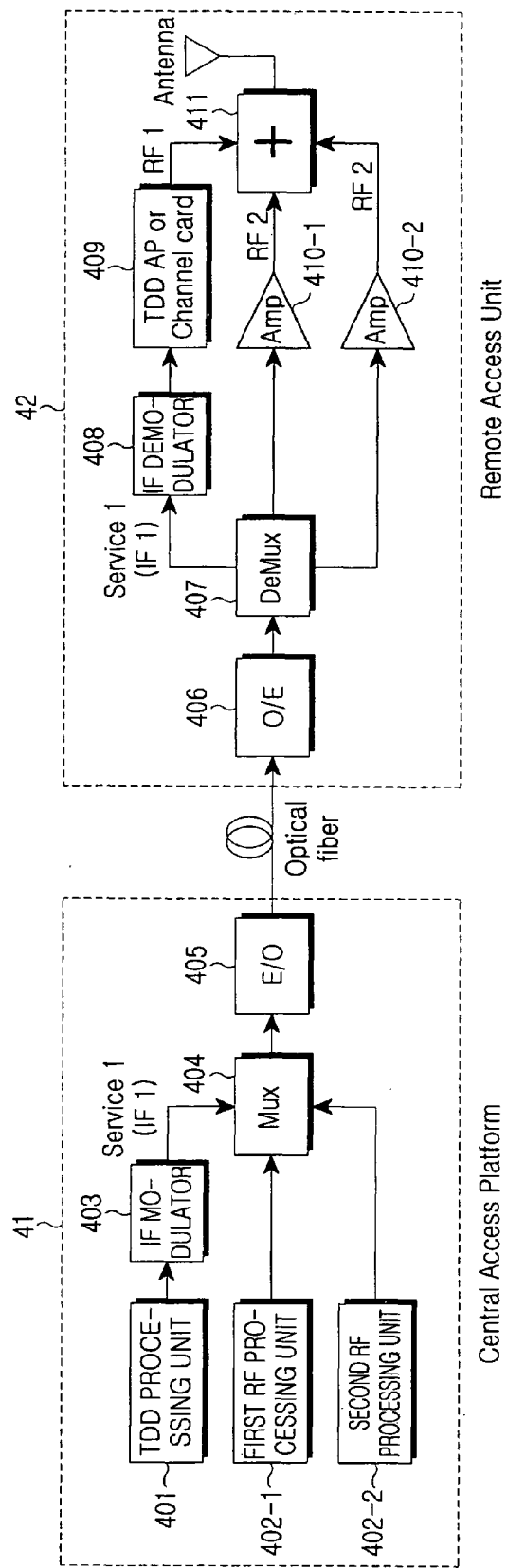
FIG. 4 is a block diagram of an ROF link apparatus capable of a TDD wireless service according to a second preferred embodiment of the present invention.

FIG. 4 is a block diagram of an ROF link apparatus capable of a TDD wireless service according to a second preferred embodiment of the present invention.

Unlike the ROF link apparatus illustrated in FIG. 2, the ROF link apparatus illustrated in FIG. 4 modulates a baseband signal to an intermediate frequency (IF) signal and transmits the IF signal to an RAU 42 in a sub-carrier multiplexing (SCM) method without transmitting the baseband signal to the RAU 42. Thus, an IF modulator 403 for IF modulating a signal output from a TDD processing unit 401 is further included in a CAP 41, an IF demodulator 408 for IF demodulating a demultiplexed IF signal is further included in the RAU 42, and the other operations and configurations are the same as those illustrated in FIG. 2.

A configuration of the ROF link apparatus illustrated in FIG. 4 will now be described. The CAP 41 includes the TDD processing unit 401 for receiving a TDD baseband electrical signal from an upper layer and downstream processing the received TDD baseband electrical signal, the IF modulator 403 for modulating a baseband signal output from the TDD processing unit 401 to an IF signal, first and second RF processing units 402-1 and 402-2 for receiving RF signals from upper layers and downstream processing the received RF signals, a multiplexer 404 for multiplexing signals output from the IF modulator 403 and the first and second RF processing units 402-1 and 402-2 to a single electrical signal, and an electro-optical converter 405 for converting the multiplexed electrical signal to an optical signal.

The RAU 42 includes an opto-electrical converter 406 for converting the optical signal received through an optical fiber to an electrical signal, a demultiplexer 407 for demultiplexing the electrical signals multiplexed by the multiplexer 404 of the CAP 41, first and second RF amplifiers 410-1 and 410-2 for amplifying RF signals among the demultiplexed signals, the IF demodulator 408 for demodulating an IF signal among the demultiplexed signals to TDD baseband data, a TDD AP 409 for processing the TDD baseband data received from the IF demodulator 408 to an RF signal, and a coupler 411 for coupling the RF signals output from the TDD AP 409 and the first and second RF amplifiers 410-1 and 410-2 to a single signal and outputting the single signal through an antenna.

For a TDD WLAN signal, the baseband signal in the CAP 41 is a 100 Base-TX Ethernet (100 Mb/s) signal. To convert the 100 Base-TX Ethernet signal to an optical signal using the electro-optical converter 405, a media conversion process from the 100 Base-TX signal to a 100 Base-FX signal is necessary. The media conversion process is performed by the TDD processing unit 401.

Accordingly, the RAU 42 also needs a process of converting the 100 Base-FX signal opto-electrically converted by the opto-electrical converter 406 and passing through the demultiplexer 407 to the 100 Base-TX signal. This process is performed by the TDD AP 409 in the instant embodiment. To do this, a media converter may be added to a front end of the TDD AP 409 to consider the TDD AP 409 as a simple AP. In FIG. 4, this media conversion function is performed by the TDD AP 409.

When a baseband signal is directly modulated to an optical signal, an extinction ratio can be an important element for determining a transmission characteristic. For a 100 Base-TX Ethernet system, it can be considered that a data transmission capability is not degraded with an extinction ratio of 1 to 2 dB. Thus, when a baseband signal and RF signals are multiplexed and simultaneously optical modulated, rigid correlation setting between an optical modulation index (OMI) of an electro-optical converter for the RF signals and an extinction ratio of the baseband signal does not have to be significantly considered.

Figure 5:
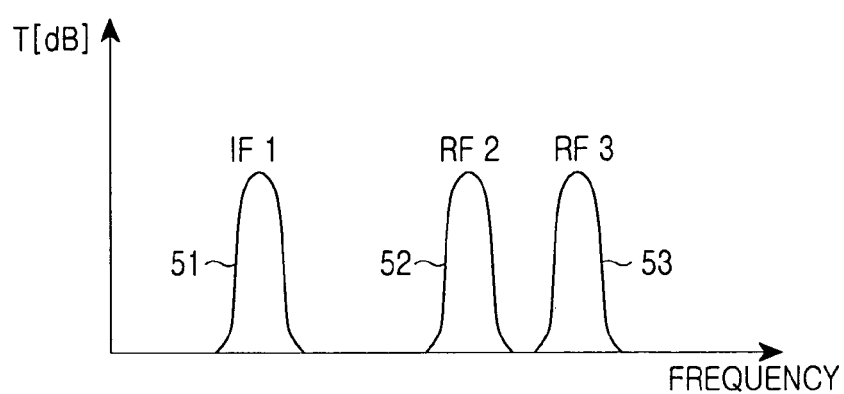
FIG. 5 is a diagram for explaining a frequency characteristic for multiplexing/demultiplexing in the ROF link apparatus illustrated in FIG. 4.

FIG. 5 is a diagram for explaining a frequency characteristic for multiplexing/demultiplexing in the ROF link apparatus illustrated in FIG. 4.

Referring to FIG. 5, according to the frequency characteristic for multiplexing/demultiplexing in the ROF link apparatus illustrated in FIG. 4, a baseband signal 51 and RF signals 52 and 53 are multiplexed/demultiplexed based on respective frequencies.

As described above, according to the embodiments of the present invention, by disposing an AP in an RAU of an ROF link apparatus capable of a TDD wireless service, a normal TDD wireless service can be provided with a native advantage of the ROF link apparatus, i.e., the extension of a serviceable range.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A radio over fiber (ROF) link apparatus for providing a stable TDD wireless service for a time division duplexing (TDD) baseband signal, the ROF link apparatus comprising:
   a central access platform (CAP) for:
      receiving various kinds of data including the TDD baseband signal from upper layers,
      multiplexing the data,
      electro-optically converting the multiplexed data, and
      transmitting the converted data as downstream data through an optical fiber; and
   a remote access unit (RAU) for:
      receiving the downstream data through the optical fiber,
      opto-electrically converting the received downstream data to the multiplexed data,
      demultiplexing the multiplexed data,
      performing a wireless access process of the demultiplexed data, and
      transmitting the wireless access processed data to a wireless local area network (WLAN) service terminal through an antenna;
   wherein the CAP does not have WLAN Access Points (APs) disposed therein for TDD communications and the RAU includes a TDD access point (AP) for processing a TDD baseband signal among the demultiplexed signals to an RF signal for WLAN communication; and
   wherein the CAP includes:
      a TDD processing unit for receiving the TDD baseband signal from the upper layer and downstream processing the received TDD baseband signal;
      a plurality of radio frequency (RF) processing units for receiving RF signals from the upper layers and downstream processing the received RF signals;
      a multiplexer for multiplexing signals separately output from the TDD processing unit to the multiplexer and from the plurality of RF processing units to the multiplexer into a single electrical signal;
      a first electro-optical converter for converting the electrical signals multiplexed by the multiplexer to an optical signal; and
      a transmitter for transmitting the converted optical signal through the optical fiber.

2. The ROF link apparatus of claim 1, wherein the RAU comprises:
   an opto-electrical converter for converting the optical signal received through the optical fiber to an electrical signal;
   a demultiplexer for demultiplexing the electrical signal converted by the optoelectrical converter to signals;
   a plurality of RF amplifiers for amplifying RF signals among the demultiplexed signals;
   a coupler for coupling the RF signals output from the plurality of RF amplifiers and the TDD AP to a single signal; and
   a transmitter for outputting the single signal to the WLAN service terminal through the antenna.

3. The ROF link apparatus of claim 1, wherein the CAP comprises:
   a TDD processing unit for receiving the TDD baseband signal from the upper layer and downstream processing the received TDD baseband signal;
   an intermediate frequency (IF) modulator for modulating a baseband signal output from the TDD processing unit to an IF signal;
   a plurality of RF processing units for receiving RF signals from the upper layers and downstream processing the received RF signals;
   a multiplexer for multiplexing signals output from the IF modulator and the plurality of RF processing units to a single electrical signal;
   a first electro-optical converter for converting the multiplexed electrical signals to an optical signal; and
   a transmitter for transmitting the converted optical signal through the optical fiber.

4. The ROF link apparatus of claim 3, wherein the RAU comprises:
   an opto-electrical converter for converting the optical signal received through the optical fiber to an electrical signal;
   a demultiplexer for demultiplexing the electrical signal converted by the opto-electrical converter to signals;
   a plurality of RF amplifiers for amplifying RF signals among the demultiplexed signals;
   an IF demodulator for demodulating an IF signal among the demultiplexed signals to a TDD baseband signal;
   a TDD AP for receiving the TDD baseband signal demodulated by the IF demodulator and processing the TDD baseband signal to an RF signal for WLAN communication;
   a coupler for coupling the RF signals output from the plurality of RF amplifiers and the TDD AP to a single signal; and
   a transmitter for outputting the single signal to the WLAN service terminal through the antenna.

5. The ROF link apparatus of claim 2, wherein the TDD processing unit performs a media conversion function of converting a 100 Base-TX signal, which is the baseband signal received from the upper layer, to a 100 Base-FX signal, which is a baseband signal for optical modulation.

6. The ROF link apparatus of claim 5, wherein the RAU further comprises:
   a media converter in a front-end of the TDD AP to convert the 100 Base-FX signal, which is the baseband signal for optical modulation, to the 100 Base-TX signal, which is the baseband signal received from the upper layer.

7. The ROF link apparatus of claim 5, wherein the TDD AP of the RAU performs a function of converting the 100 Base-FX signal, which is the baseband signal for optical modulation, to the 100 Base-TX signal, which is the baseband signal received from the upper layer.

8. The ROF link apparatus of claim 1, wherein an extinction ratio of the TDD baseband signal is lowered not to affect the TDD baseband signal or the RF signals in a process of modulating the TDD baseband signal and the RF signals to a single optical signal.

9. The ROF link apparatus of claim 1, the CAP further for:
optoelectric converting upstream data received through the optical fiber,
demultiplexing the converted upstream data, and
transmitting the demultiplexed upstream data to the respective upper layers; and
wherein the TDD process unit and each one RF processing units of the plurality of RF processing units are directly coupled to the multiplexer.

* * * * *